United States Patent
Liu et al.

(10) Patent No.: US 7,266,132 B1
(45) Date of Patent: Sep. 4, 2007

(54) FLEXIBLE MEMORY ALLOCATION FOR DATA TRANSMISSION

(75) Inventors: Xiaomei Liu, Milpitas, CA (US); Ke Shen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1057 days.

(21) Appl. No.: 10/280,697

(22) Filed: Oct. 24, 2002

(51) Int. Cl.
  *H04J 3/02* (2006.01)
(52) U.S. Cl. .................................................... 370/538
(58) Field of Classification Search ................ 370/391,
  370/395.21, 395.4–395.41, 465, 470, 472;
  711/104–106, 147–153
  See application file for complete search history.

(56) References Cited

U.S. PATENT DOCUMENTS

| | | | | |
|---|---|---|---|---|
| 5,848,258 | A * | 12/1998 | Fenwick et al. | 711/5 |
| 6,088,777 | A * | 7/2000 | Sorber | 711/171 |
| 6,334,175 | B1 * | 12/2001 | Chih | 711/170 |
| 6,381,668 | B1 * | 4/2002 | Lunteren | 711/5 |
| 6,442,661 | B1 * | 8/2002 | Dreszer | 711/170 |
| 7,065,103 | B1 * | 6/2006 | Gagnon et al. | 370/474 |

OTHER PUBLICATIONS

ISO/IEP, "Information Technology-Generic Coding Of Moving Pictures And Associated Audio: Systems", ISO/IEC 13818-1, Nov. 13, 1994, pp. 1-135.
ISO/IEC, "Coding for Moving Pictures and Audio: Overview of the MPEG-4 Standard," ISO/IEC JTC1/SC29/WG11 N4668, Mar. 2002, pp. 1-55 [www.mpeg.telecomitalialab.com/standards/mpeg-4/mpeg-4.html].

* cited by examiner

*Primary Examiner*—Chi Pham
*Assistant Examiner*—Thai Hoang
(74) *Attorney, Agent, or Firm*—Beyer Weaver LLP

(57) ABSTRACT

Described herein are data transmission systems and methods that employ flexible memory usage techniques. The techniques allocate memory to include a plurality of block pools, where each block pool includes a set of blocks having a memory size common to the block pool. The number of block pools and common memory size for each may be determined according to the current transmission demands for the bit streams and channels being serviced. A processor for the network device then allocates data from multiple bit streams into a block in one of the block pools based on the memory requirements for the incoming data. The number of blocks may also be varied based on changing transmission demands.

30 Claims, 5 Drawing Sheets

FLEXIBLE MEMORY ALLOCATION FOR DATA TRANSMISSION

BACKGROUND OF THE INVENTION

The present invention relates generally to systems and methods for transmitting data. More particularly, the present invention relates to intelligent and flexible techniques for memory design and allocation of video data during transmission.

Communication channels deliver bit streams carrying video, audio and/or general data. A network device that transmits data through the channels is typically responsible for processing dozens or hundreds of bit streams simultaneously.

The data is often transmitted in real-time. This implies that all of the information must be delivered in a timely manner. For example, transmission of video data is often intended for real-time playback. This implies that all of the information required to represent digital pictures in the video must be delivered and displayed under time constraints according to the real-time playback.

Network devices that communicate data are frequently required to temporarily store data during transmission. This may be done to allow parallel processing related to routing protocol, or to allow data manipulation such as bit rate shaping to allow the output bit stream to fit within an output channel. To accommodate any processes that may occur before data transmission, conventional network devices typically comprise internal memory dedicated to temporary storage. How memory is allocated and how incoming data is assigned into the memory affects the amount of memory needed for a network device.

Static memory used by a network device gives each data for each channel a set amount of memory space for storage. This constant and predetermined memory space size is established conservatively to account for all possible data demands in a particular channel. For static allocation to work, the static allocation must allocate for the worst case. Since the majority of bit streams being processed are much smaller than this conservative estimation, static memory schemes usually result in excessive memory allotment. This increases network device costs. In a digital video broadcast where hundreds of bit streams are transmitted, the extra cost may add up significantly.

Dynamic memory allocation schemes flexibly distribute memory space to various channels on-the-fly. More specifically, the size of memory space given to an incoming bit stream is calculated based on the bit stream rate. One problem with this approach is that channels are frequently flipped on and off, which requires memory dedicated to a channel to be allocated and freed accordingly. Most memory operates more efficiently when contiguous. If the available memory space is scattered (memory fragmentation) to accommodate multiple bit streams, memory operations become less efficient. Even worse, memory fragmentation may result in a system not-operational due to the fact that no more contiguous memory is large enough in size to accommodate a newly established channel. Various collection techniques are used to collect data stored throughout the memory. For example, 'garbage collection' is a technique used to rearrange disparate memory portions to obtain a contiguous memory arrangement. Collation techniques such as garbage collection are difficult to implement in real-time. The reason is that once a channel occupies a block of memory, it is hard to reassign the channel to a different memory location without causing disruption to the real time channel data transmission.

Based on the foregoing there is a need for improved systems and methods to temporarily store data during transmission.

SUMMARY OF THE INVENTION

To overcome limitations in the prior art, the present invention presents systems and methods that employ flexible memory usage techniques. The techniques allocate memory to include a plurality of block pools, where each block pool includes a set of blocks having a memory size common to the block pool. The number of block pools and common memory size for each may be determined according to the current transmission demands for the bit streams and channels being serviced. For example, three block pools may be employed for transmission of data largely including three varying memory demands, e.g., transmission that mainly witnesses audio data, standard definition video data, and high-definition video data. A processor for the network device then allocates data from multiple bit streams into a block in one of the block pools based on the memory requirements for the incoming data. The number of blocks may also be varied based on changing transmission demands. Further, the number of block pools, the number of blocks in each and the common memory size for each block pool may adapt according to changing transmission needs.

In one aspect, the present invention relates to a network device for transmitting multiple bit streams having different bit rates. The network device comprises an input network interface designed or configured to receive the multiple bit streams. The network device also comprises a memory arranged to include multiple block pools. Each block pool includes a set of blocks having a memory size common to the block pool. The multiple block pools each have a different common memory size. The network device further comprises a processor designed or configured to allocate data from the multiple bit streams to a block in one of the multiple block pools when the data has a storage requirement equal to or less than the common memory size for the block pool. The storage requirement is related to at least (i) a bit rate for transmitting the data and (ii) a time delay for processing the data before transmission. The network device additionally comprises an output network interface that outputs the data.

In another aspect, the present invention relates to a method for transmitting multiple bit streams having varying bit rates. The method comprises arranging a memory space to include multiple block pools. Each block pool including a set of blocks having a memory size common to the block pool. The multiple block pools each having a different common memory size. The method also comprises receiving the multiple bit streams. The method further comprises storing data from the multiple bit streams in a block in one of the multiple block pools when the data has a storage requirement equal to or less than the common memory size for the block pool. The method also comprises transmitting the multiple bit streams onto an output channel.

In yet another aspect, the present invention relates to a system for transmitting multiple bit streams having different bit rates. The system comprises means for arranging a memory space to include multiple block pools, each block pool including a set of blocks having a memory size common to the block pool. The multiple block pools each having a different common memory size. The system also comprises means for receiving the multiple bit streams. The system further comprises means for storing data from the multiple bit streams in a block in one of the multiple block pools when the data has a storage requirement equal to or less than the common memory size for the block pool. The system also comprises means for transmitting the multiple bit streams onto an output channel.

In yet another aspect, the present invention relates to a computer readable medium including instructions for transmitting multiple bit streams having varying bit rates. The computer readable medium comprises instructions for arranging a memory space to include multiple block pools, each block pool including a set of blocks having a memory size common to the block pool. The multiple block pools each having a different common memory size. The medium also comprises instructions for receiving the multiple bit streams. The medium further comprises instructions for storing data from the multiple bit streams in a block in one of the multiple block pools when the data has a storage requirement equal to or less than the common memory size for the block pool. The medium also comprises instructions for transmitting the multiple bit streams onto an output channel.

These and other features and advantages of the present invention will be described in the following description of the invention and associated Figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
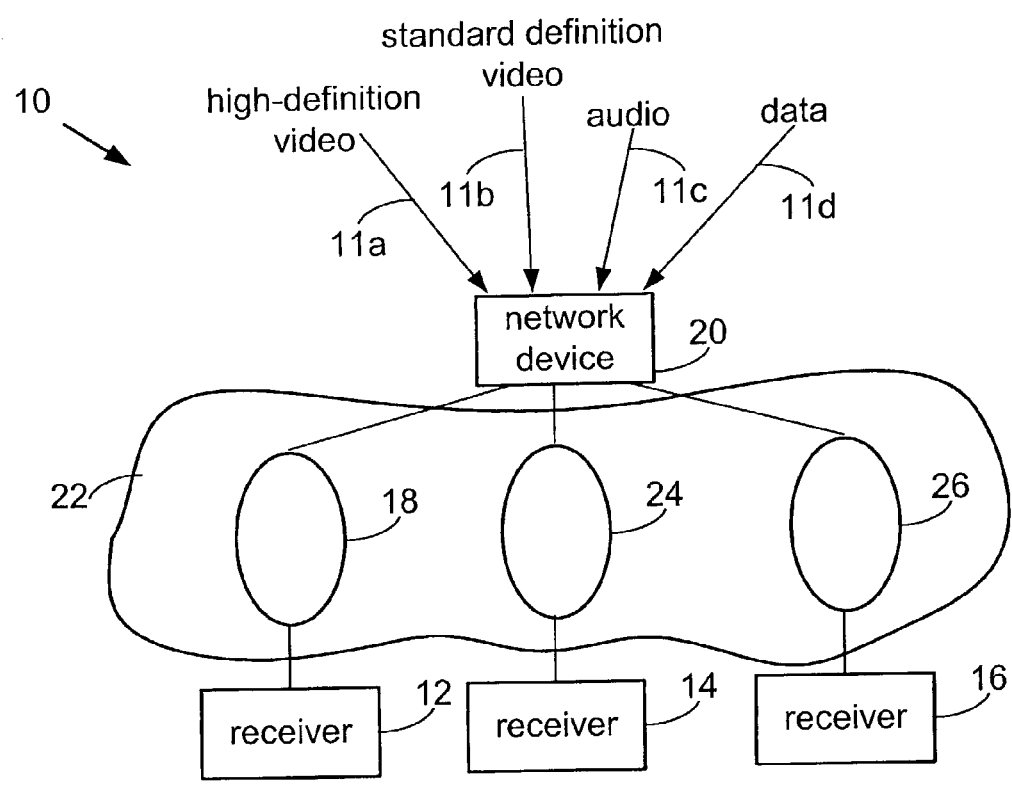
FIG. 1 illustrates an exemplary network system for transmitting data in accordance with one embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

The present invention implements adaptable data storage techniques that vary memory allocation based on transmission demands imposed on a network device. Firstly, the present invention arranges a memory space to include a number of block pools. Each block pool includes multiple blocks and is characterized by a memory size common to blocks in that pool. By including many blocks of a common size, the block pool services data having a particular storage requirement less than or equal to its common memory size. Secondly, the present invention allocates incoming data to a block in a block pool based in its memory needs. In a data transmission environment for example, incoming data may be probed to determine its memory needs—and then allocated to a suitable block pool.

By fitting data to memory tailored to the data storage requirements, excessive memory requirements are avoided despite vast bit rate needs in the data being transmitted. Real-time data transmission is complicated by vastly divergent transmission demands of different types of data being sent. For example, audio data generally requires significantly less memory space than video data; and video data may include high-definition video that requires significantly more memory than standard definition video. For a transmission scenario predominantly faced with these three types of data, the present invention may arranged memory to include three block pools—one having blocks with a common memory size that accommodates audio data, one having blocks with a common memory size that accommodates standard video data, and one having blocks with a common memory size that accommodates high-definition definition video data. In this manner, memory is efficiently adapted to the disparate storage requirements.

The number of blocks for each block pool may be arranged according to the current transmission demands for the bit streams and channels being serviced. Thus, in the preceding example, the first block pool may have a number of blocks related to the number of audio streams being transmitted, the second block pool may have a number of blocks related to the number of high-definition video streams being transmitted, and the third block pool may have a number of blocks related to the number of standard definition video streams being transmitted. The number of block pools, the size of each block pool, and the number of blocks within each pool may also vary with transmission demand. Thus, more block pools may be added (or removed) if transmission requirements vary from the current block pool arrangement.

Thus, the present invention prearranges according to anticipated system design (application driven). The memory is prearranged such that it may satisfy the worst case transmission scenario under the constraint of a maximum transmission need. In one embodiment, the memory is allocated based on channels and the channels are added or deleted dynamically. When a channel is added, according to the characteristics of the channel, a pre-allocated memory block is assigned to the channel. When a channel is deleted, the assigned memory block is returned to the pool, which can be re-used if there is another channel added later on.

The present invention thus minimizes the total memory usage given the characteristics of an application, including the total bandwidth of the system, total number of channels supported and the maximum supported bandwidth of each channel. For applications having transmission requirements that are dynamic in nature, such as IP traffic that includes video on demand, the present invention reduces the amount of memory needed to temporarily store data during transmission. This may reduce memory costs associated for a network device.

Referring now to FIG. 1, an exemplary transmission system 10 where flexible data storage techniques in accordance with the present invention are particularly useful will be described. System 10 is responsible for transmitting data from multiple bit streams 11*a-d* to target receivers 12, 14 and 16. Bit stream 11*a* includes compressed video data having a high bit rate and high storage requirements (relative to other data being transmitted), such as high-definition video data. Bit stream 11*b* includes compressed video data having a lesser bit rate than bit stream 11*a*, such as standard definition video data. Bit stream 11*c* includes compressed audio data. Bit stream 11*d* includes general data such as email or web page based information. Although system 10 is shown only with four-bit streams 11*a-d* for sake of discussion, it is understood that a network system may have hundreds or thousands of bit streams being processed simultaneously. Each bit stream 11*a-d* may have a different transmission bit rate and memory requirement for temporary storage within network device 20. In addition, each bit stream 11 may be transmitted via a different communication channel.

There are presently a variety of different communication channels for transmitting or transporting video data. For example, communication channels such as coaxial cable distribution networks, digital subscriber loop (DSL) access networks, ATM networks, satellite, terrestrial, or wireless digital transmission facilities are all well known. Many standards have been developed for transmitting data on the communication channels. For the purposes herein, a channel is defined broadly as a connection facility to convey digital information from one point to another. A channel includes some or all of the following elements: 1) physical devices that generate and receive the signals (modulator/demodulator); 2) medium that carries the actual signals; 3) mathematical schemes used to encode and decode the signals; 4) proper communication protocols used to establish, maintain and manage the connection created by the channel 5) storage systems used to store the signals such as magnetic tapes and optical disks. The concept of a channel includes but is not limited to a physical channel, but also logical connections established on top of different network protocols, such as xDSL, ATM, IP, wireless, HFC, coaxial cable, Ethernet, Token Ring, etc. The channel is used to transport a bit stream, or a continuous sequence of binary bits used to digitally represent video, audio and/or data. The bit rate is the number of bits per second that a bit stream is being transmitted at. The channel capacity is the maximum bit rate at which a channel can convey digital information without introducing excessive error.

Network device 20 receives—and transmits—data included in bit streams 11*a-d*. Between reception and transmission, the data is temporarily stored. During storage, network device 20 may perform one or more processing operations on the data. For example, network device 20 may multiplex and/or re-multiplex compressed video data from multiple bit streams. In some cases, network device 20 converts the bit rate of compressed video data to help an output bit stream fit within the allowable channel bandwidth between the network device 20 and one of target receivers 12, 14 and 16. Functions performed during storage of data within network device 20 may vary with a particular network system or network device.

Regardless of any parallel processing operations performed, network device 20 stores the data for a limited time. The amount of memory space designated for incoming data will typically depend on at least (i) a bit rate of the incoming data and (ii) a time delay for processing the data before transmission. Network device 20 frequently implements a substantially constant time constraint for all bit streams being transmitted. In one embodiment, the substantially constant time delay is related to the end to end system delay for all channels being serviced. In another embodiment, each channel imposes a predetermined time delay for processing by network device 20. The delay for all bit streams need not be the same. As long as the memory requirement of a single given bit stream is constant, the bit rate may be used to assess the memory requirement. Often, the memory requirement is known when a channel is started. For some channels and data transmission applications, it may be desirable to store the data from about 10 milliseconds to about 1000 milliseconds. For some video on demand applications, it may be desirable to store the data from about 30 milliseconds to about 500 milliseconds to allow for jitter removal and clock compensation support and other processing for example. This may be designated by application requirements, the type of processing needs to be performed, and system speed, for example. Once the time delay is known, the data storage in network device 20 may then be estimated according the bit rate used to transmit the data.

In some cases, such as within a telco environment, network device 20 is aware of the content requests of a target receiver that it transmits to and the available bandwidth therebetween, and may determine storage time according to the outlet channel needs. For example, the processing delay varies dramatically whether the rate conversion is needed or not. Thus, network device 20 may also process incoming bit streams and extract the bit rate of each bit stream as needed. For compressed video data for example, the incoming bit rate is stored in the sequence header of the incoming bit stream of variable bit rate compressed video data.

In some cable distribution networks, data is transmitted via network device 20 through local networks and then to receivers and decoders. Network device 20 and the local networks together form a distribution network for the data. In one exemplary cable distribution network, network device 20 is a so-called "super head-end" facility that feeds multiple video programs to smaller regional head-ends within local networks via fiber optical networks (such as SONET or DWDM based networks). Each regional head-end in turn is connected to its own population of target receivers and decoders. In this case, a substantially constant time delay is used to transmit the data at each node in the transmission.

Target receiver 12 receives data from network device 20 through a local network 18. Local network 18 is included in a larger network 22 that also includes local networks 24 and 26, which service the target receivers 14 and 16, respectively. In one embodiment, network device 20 is a headend and local network 18 corresponds to a geographic service area of a cable network serviced by the headend. Receiver 12 may then correspond to a receiver included in a set-top box or personal computer located in a residential home.

Figure 2:
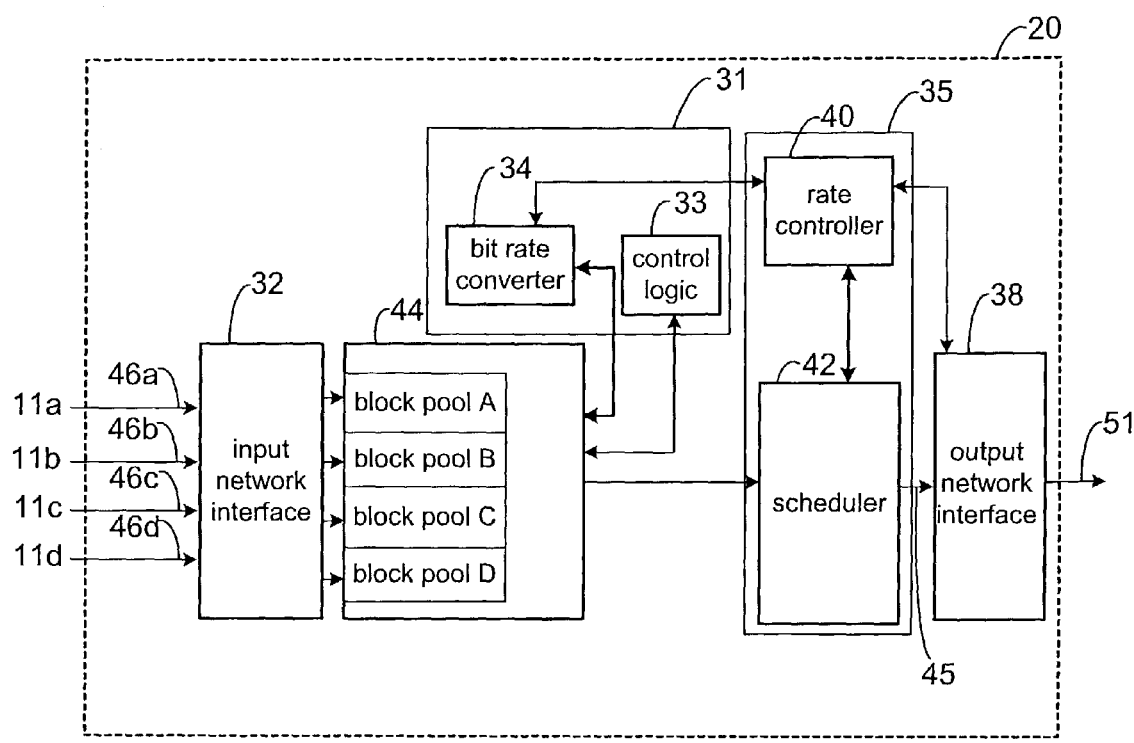
FIG. 2 is a block diagram of the network device included in the system of FIG. 1 in accordance with one embodiment of the present invention.

FIG. 2 illustrates a block diagram of network device 20 of FIG. 1, which transmits bit streams including data in accordance with one embodiment of the present invention. While the present invention will now be described as an apparatus composed of units, those skilled in the area will recognize that the present invention encompasses a method, process or software having as elements the actions performed by each unit and described below.

Network device 20 comprises: input network interface 32, memory 44, processor 31 comprising memory access and control logic 33 as well as bit rate converter apparatus 34, multiplexer 35, and output network interface 38. Multiplexer 35 comprises rate controller 40 and scheduler 42. As one of skill in the art will appreciate, each of the structures of network device 20 may be a single hardware and/or software structure, multiple hardware and/or software structures, or combined in another software apparatus scheme, and the design shown in FIG. 1 is not meant to be limited by arrangement.

Input network interface 32 has a plurality of input lines 46a-d that receive bit streams 11a-d from a variety of transmission sources, and includes suitable receiving components to receive the bit streams from each source. For example, input line 46a is coupled to a satellite receiver that receives data from a satellite based communication system. Input line 46b receives data from an Internet network including a series of ATM based routers which route the data to network device 20. Input line 46c is coupled to a receiver that receives data from a terrestrial source and network interface 32 may also include a suitable frequency demodulation and descrambling facilities. The line 46d receives data from an Internet network using IP protocol that routes a bit stream from a streaming server to the network device 20. While network device 20 shows only four incoming bit streams and channels being serviced, one of skill in the art will recognize that any number of bit streams and channels may be serviced by input network interface 32. Input network interface 32 includes a number of output lines that provide compressed video data to memory 44. Network device 20 may also include additional facilities, disposed between input network interface 32 and memory 44, to parse any timing, programming, video data, and other auxiliary information, as appropriate.

Memory 44 may comprise one or more memory units, such as one or more conventionally available RAM units. Each memory 44 includes one or more inlets that receive data, e.g., from an outlet of network interface 32, and includes one or more outlets that lead to processing facilities within network device 20. As shown, an outlet of memory 44 leads to an inlet of bit rate converter apparatus 34, an inlet of scheduler 42 and an inlet of processing logic 33. Memory 44 stores data. As will be described in further detail below, memory 44 is arranged to include a number of block pools each having a number of blocks.

Processor 31 is designed or configured to allocate data from the multiple bit streams to a block in one of the multiple block pools when the data has a storage requirement equal to or less than the common memory size for the block pool. To do this, processor 31 may communicate with input network device 32 and memory 44. Processor 31 may also include suitable memory access and control logic 33 to communicate with memory 44 and allocate data therein.

Coupled to an output of memory 44 is bit rate converter apparatus 34. When necessary, bit rate converter apparatus 34 transcodes video data in one or more of the incoming bit streams. Broadly speaking, transcoding refers to altering data or information in a bit stream. When desirable, the network device 20 reduces the bit rate of the data transmitted in the output 45 based on the channel capacity of the channel between the network device 20 and the target decoder. For compressed video data, bit rate conversion of a bit stream refers to the process performed on compressed video data that results in a different transmission bit rate than the originally compressed video data was encoded with. In a typical scenario, the new bit rate for the output bit stream 34 is smaller than the original bit rate of the input bit stream, but sometimes the resulting bit rate may increase. The bit rate conversion may occur on any one or more of the bit streams received by the network device 20. For example, bit rate converter apparatus 34 may adapt the bit rate of video data from bit stream 11a before transmitting it in a multiplex. Bit rate conversion of a compressed bit stream is further described in commonly owned U.S. Pat. No. 6,181,711, which is incorporated by reference herein for all purposes.

Multiplexer 35 comprises rate controller 40, scheduler 42 and any multiplexer buffers that receive compressed video data from bit streams 11a-d, either as received by network device 20 or as transcoded by bit rate converter apparatus 34. Scheduler 42 determines the relative order of data transmission from network device 20. The multiplexer also includes rate controller 40, which is in digital communication with bit rate converter apparatus 34 and scheduler 42. Bit rate converter apparatus 34 and scheduler 42 use information from rate controller 40 to determine how much to rate reduce the video data from each input bit stream 11a-d and how to allocate the output channel bandwidth among bit streams 11. In another embodiment, rate controller 40 is separated from multiplexer 35.

Output network interface 38 transmits data onto a suitable channel. Output network interface 38 has a plurality of output lines that transmit bit streams to a variety of sources using suitable transmitting components. For example, output network interface 38 may comprise a transmitter known in the art for DSL networks. Output network interface 38 may also comprise a transmitter known in the art for IP networks, for example. In a specific embodiment, the output medium is an Internet network where network interface 38 transmits through a series of nodes, which route the multiplexed bit stream to a suitable receiver. Network interface 38 may also comprise a transmitter known in the art for ATM networks, for example. In a specific embodiment, the output medium is an Internet network where network interface 38 transmits through a series of ATM based routers which route the MPEG-2 compressed video data to a suitable receiver. The output of network interface 38 forms the output 51 of network device 20.

While the input and output network interfaces 32 and 38 are illustrated in FIG. 2 as separate structures, it is understood that in many network devices, a common network interface may be implemented that includes both receiving and transmitting functionality, and associated facilities, as one of skill in the art will appreciate. For example, the common network interface may include all the receiving and transmitting services as described above with respect to input network interface 32 and output network interface 38.

Figure 3A:
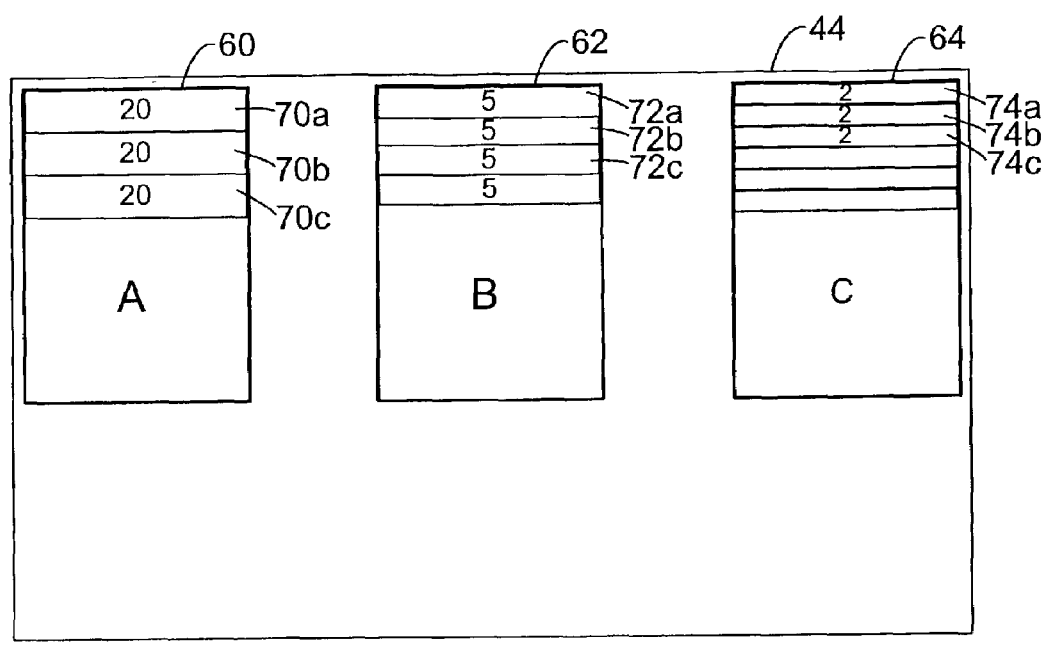
FIG. 3A is an illustrative diagram of memory included in the network device of FIG. 2 in accordance with one embodiment of the present invention.
Figure 3B:
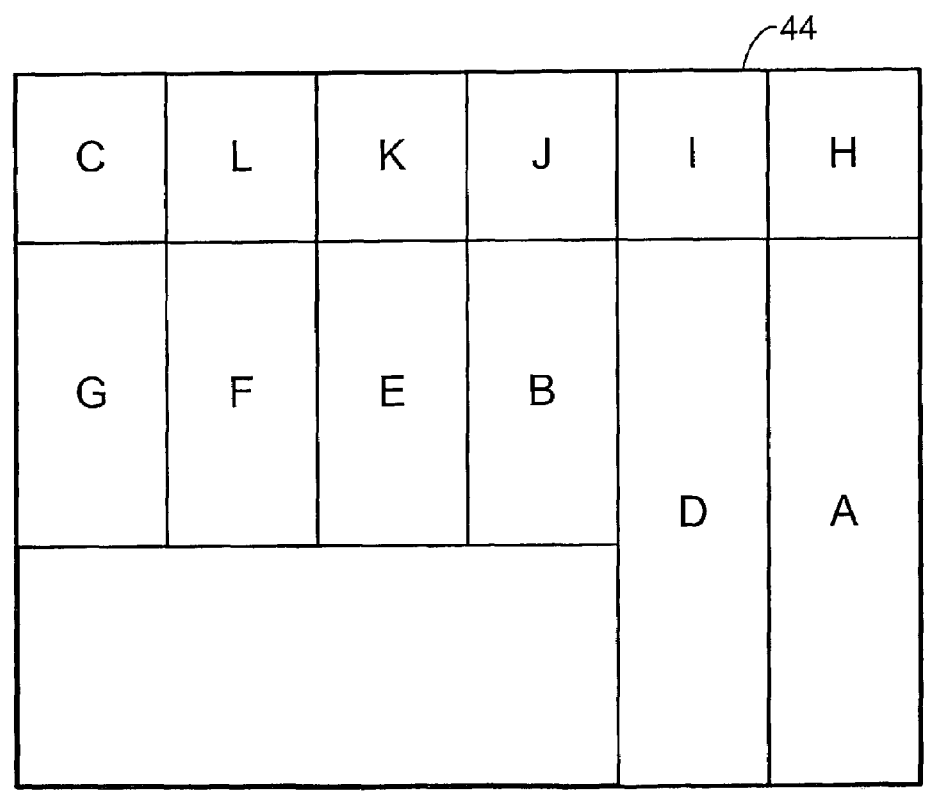
FIG. 3B is an illustrative diagram of the memory included in the network device of FIG. 2 specifically having twelve block pools.

FIGS. 3A-3B are illustrative diagrams of a memory 44 of FIG. 2 in accordance with one embodiment of the present invention. Memory 44 may be used for memory functions common to a network device such as jitter removal and clock compensation support, storage during transmission, storage during alternative processing, etc. In one embodiment, memory 44 comprises one or more convention RAM sources. Referring to FIG. 3A, space within memory 44 is arranged to include block pools 60, 62, and 64.

FIG. 3A shows block pools 60, 62 and 64 separated for illustrative purposes. Each block pool stores data in blocks that have a common memory size for that block pool. A block is a portion of memory arranged to allow data storage up to the common memory size designated for the block pool that the block is included in. For example, block pool 60 includes blocks 70 that store data requiring less than or equal to 20 MB of memory space. Similarly, block pool 62 includes blocks 72 that store data requiring up to 5 MB of memory space, and block pool 64 includes blocks 74 that store data requiring up to 2 MB of memory space. In the transmission example described above, block pool 60 is well-suited to store high-definition video data, block pool 62 is well-suited to store standard definition video data, and block pool 64 is well-suited to store audio data. In one embodiment, each block pool is a contiguous section of memory.

During data transmission, storage of incoming data comprises allocation of the data to a particular block in one of block pools 60, 62, and 64. The allocation is based on the memory requirements the data and the available memory sizes currently arranged in the memory. Before data is allocated to memory, the memory is first arranged. This includes determining how many block pools to use, a common memory size for each block pool, and the number of blocks in each pool. This memory arrangement is calculated based on the application requirement to meet the requirement of worst case scenario. In some cases, the number of pools and the block size of each pool cannot be changed once calculated since any rearrangement may cause a disruption to real time data processing. In this scenario, what can be changed is where the next coming channel will be located in the memory. In one embodiment, the goal for flexible memory allocation of the present invention is to minimize memory usage.

As shown in FIG. 2, network interface 32 receives multiple bit streams from a plurality of channels. In this case, memory 44 may be arranged based on the transmission load presented by the channels. In a specific embodiment, the number of block pools is related to one or more of: the number of channels, the maximum bandwidth for any one of the channels, and the total input bandwidth for all channels being currently serviced. In addition, the common memory size for each block pool may be related to one or more of: the number of channels, the maximum bandwidth for the plurality of channels, and the total input bandwidth for all channels currently being serviced. A processor controlling data allocation into the memory is then designed or configured to allocate data from a particular channel to a block in a block pool based on the current bandwidth requirements of the particular channel.

More specifically, a common memory size may be related to the number of channels being serviced. In this case, the network interface receives multiple bit streams from a plurality of channels and the common memory size for one or more block pools is determined such that a block pool services a particular input bandwidth for a channel. For example, an ATM or DSL channel will have a predetermined bandwidth that a block pool may be designed to service. Thus, block pool 62 may be used to service a DSL line that has a channel bandwidth of 5 Mbps and a transmission delay of approximately one second for transmission across network device 20. For this channel servicing scenario, the network device processor then allocates data from a particular channel to block pool 62 when the data requires 5 MB or less of memory space.

The memory arrangement may vary over time. In this case, the processor may implement a dynamic scheme to alter the memory arrangement based on the current transmission needs. In one embodiment, the number of block pools designated in memory 44 may be related to one or more of: the number of channels being serviced, the maximum bandwidth for channels being serviced, and the total input bandwidth for all channels being serviced. One particular example of how these parameters may be embodied to determine the number of block pools is:

$$M = Ln(N B_{max}/W)$$

where M is the number of block pools, N is the maximum number of channels that the network device currently supports, $B_{max}$ is the maximum channel bandwidth currently being supported (B in general for the equations herein refers to memory size based on bandwidth and a constant time delay), and W is the total input bandwidth currently being supported. Instead of counting the number of channels being serviced, the number of block pools may be determined based on the number of bit streams being serviced, the maximum channel bandwidth and the total bit rate of the multiple bit streams being supported. In some instances, the memory may include from 2 to 20 block pools based on the current transmission needs of the network device. In other cases, from 2 to 5 block pools may be suitable to service current transmission needs for a network device. FIG. 3B illustrates memory 44 specifically with twelve block pools A-L.

In one embodiment, the common memory size for each of the block pools may be related to one or more of: the number of channels being serviced, the maximum bandwidth for channels being serviced, and the total input bandwidth for all channels being serviced. One particular example of how this may be embodied is:

$$B_i = \left(\frac{W}{N}\right)^{\frac{M-i}{M}} B_M^{\frac{i}{M}}$$

and $B_M = B_{max}$, where i=1, 2, 3 ... (M−1)

where $B_i$ is the common memory size for the $i^{th}$ block pool from 1 up to (M−1). In a specific embodiment, the common memory size for a block in one of the plurality of block pools is arranged to include from about 0.1 MB to about 80 MB per block in the block pool. In some cases, the common memory size for a block in one of the plurality of block pools is arranged to include from about 1 MB to about 20 MB per block. Obviously, the amount of memory needed will change with the time delay imposed by the network device. Often, the system or network under consideration is known in terms of the data being transmitted, and thus the maximum requirement for data transmission, $B_{max}$, is known and determined based on the application. When M=2, $B_i$ simplifies to:

$$B_1 = \left(\frac{WB_{max}}{N}\right)^{\frac{1}{2}}$$

and $B_2 = B_{max}$.

In another embodiment, one or more block pools are dedicated to a particular input signal carrying a known and substantially consistent transmission bit rate. For an HDTV signal for example. For 20 Mbps input rate and 1 second delay of rate conversion processing, the memory must contain at least 2.5 MB. In this case, a dedicated block pool that allows 3 MB of storage per block may be arranged. Alternatively, an application may dictate several specific transmission requirements, including the maximum requirement for transmission, $B_{max}$, and block pools are dedicated according to the application.

Data is allocated to the blocks such that the memory required for the data, B, fits between blocks having a common memory size between $B_i$ and $B_{i+1}$, such that $B_i < B < B_{i+1}$. The processor then allocates the data to a block pool having memory $B_{i+1}$.

The number of blocks in a block pool may also be determined based on transmission demands. In one embodiment, the number of blocks is related to the total bandwidth that the network device services and a common block size for another block pool. One specific example is:

$$Y_i = int\left(\frac{W}{B_{i-1}}\right)$$

where $Y_i$ is the number of slots in the current block pool and $B_{i-1}$ is the common block pool size for the block pool having the next smaller common block pool size. Block pools arranged to include between 1 and 100 blocks may be suitable for some applications. In other cases, block pools arranged to include between 1 and 10 blocks may be suitable.

It should be noted that the memory allocation techniques described work together with the given transmission demands of the network being serviced. A network device is designed to handle a certain transmission demand. This is usually limited by the processing power of the network device and other transmission constraints. Once the constraints are known, the present invention prearranges memory in a way such that the network device can satisfy the worst case scenario. For example, the memory may include a number of block pools required by a network currently being serviced. In addition, the common memory size for each block pool may be adapted to the network being serviced. Since the memory requirements for data being transmitted by a network device may vary with the number of active channels and the data in these channels, the present invention may alter memory allocation based on the data, input bit streams, and/or channels being serviced. In this manner, the number of blocks and each block pool may also be tailored to the transmission demand. In some applications, real time rearrangement of a memory block may cause disruption to the real time data service. The channels come and go in a dynamic nature, and the present invention finds memory space for the new coming channel that satisfies the memory need of this channel within the current arrangement.

Thus, the present invention may be used in a wide array of applications where memory storage requirements during transmission are dynamic in nature. In addition, the minimum system requirements for memory may be obtained once the number of block pools, the total input bandwidth, the maximum number of channels that the network device currently supports, and maximum bandwidth to be supported are determined. For example, the total memory may be estimated as:

$$T = WM\left(\frac{NB_{max}}{W}\right)^{\frac{1}{M}}$$

Figure 4:
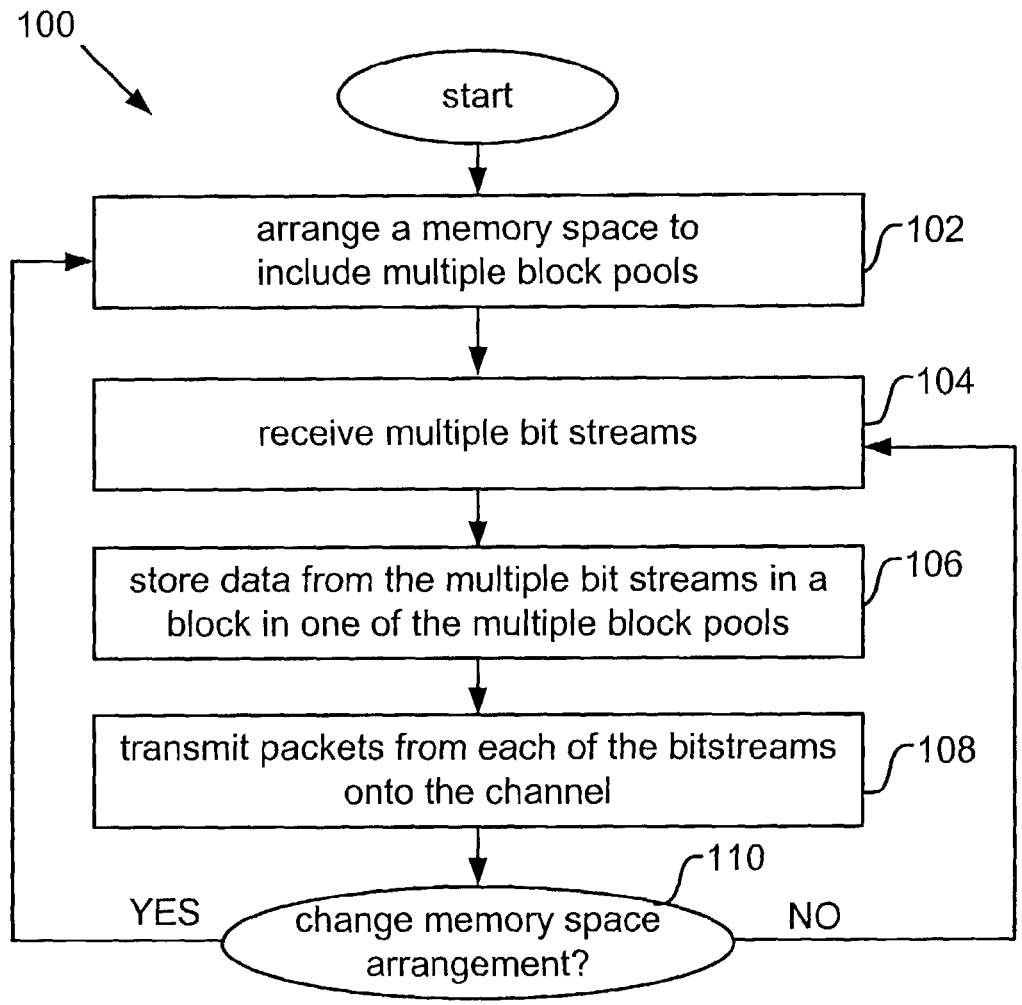
FIG. 4 illustrates a process flow for transmitting data in accordance with one embodiment of the present invention.

FIG. 4 illustrates a process flow 100 for transmitting multiple bit streams having varying bit rates onto a channel in accordance with one embodiment of the present invention. Process flow 100 may take place in any network device such as the network device 20 of FIG. 2. Processes in accordance with the present invention may include up to several additional steps not described or illustrated here in order not to obscure the present invention. While data transmission will now be described as a method, those skilled in the area will recognize that the present invention encompasses a system or software having units capable of performing the actions as described below.

Process flow 100 begins by arranging a memory space to include multiple block pools (102). Each block pool includes a set of blocks having a memory size common to the block pool. Regardless of the number of block pools used, the multiple block pools each having a different common memory size. It is understood that the number of block pools and the common memory dedicated for each may change over time, e.g., with changing transmission demands encountered by the network device.

Once the block pool sizes have been determined, incoming data is received and entered into each of block pools according to the incoming data storage requirements. The bit streams are received (104) from channels associated with one or more sources, such as satellite and Internet sources. Receiving the bit streams may also include any necessary demodulation, descrambling, and parsing of any timing, programming, video data, and other auxiliary information, as appropriate.

The data is then stored from the multiple bit streams in a block in one of the multiple block pools—when the data has a storage requirement equal to or less than the common memory size for that block pool (106). In one embodiment, the multiple bit streams are received from a plurality of channels allocating the data from a particular channel to a block in a block pool is based on the bandwidth requirement of the particular channel. If the channel bandwidth and temporal requirements are such that the memory required for the data, B, fits between blocks having a common memory size between $B_i$ and $B_{i+1}$, such that $B_i<B<B_{i+1}$, then the data will be allocated to a block pool having memory $B_{i+1}$. Similarly, in the case of continual channel service, the channel will continuously be allocated to a block pool having memory $B_{i+1}$. To avoid memory fragmentation, the channel storage will be allocated in turn to the memory blocks.

While the data is stored, alternative processing may occur. For example, if the channel bandwidth is not enough to meet delivery needs for all the incoming video data, rate reduction is used to decrease the bandwidth requirement to meet the available bandwidth. Transcoding, such as bit rate conversion, may be performed on any one of the bit streams. Bit rate alteration of one or more of the compressed bit streams may be based on the bit rate capacity of the channel between the network device and the target decoder. In some embodiments, a compressed bit stream may be partially encoded or decoded to facilitate transcoding. The bit rate alteration may then occur on compressed video data, uncompressed video data, or at any partial compression status therebetween. By way of example, the bit rate alteration may include partial decoding, re-quantization, and VLC encoding to reduce redundancy and produce compressed video data with less information and a lower bit rate. Alternatively, the bit rate alteration may include full or partial decoding and downsampling that takes a high resolution video data and converts it to lower resolution video data. In another embodiment, the present invention relates to bit rate alteration methods that use a combination of bit rate alteration techniques. If there is sufficient bandwidth to send all the video channels, transcoding may be skipped.

Alternative processing may also include scheduling. During scheduling and processing of multiple bit streams by the network device, a multiplexer decides how to send out data from each of the buffers and allocates the output channel accordingly. This includes sending out a number of bits from each buffer as determined by the multiplexer.

Once scheduling is complete, the multiplexed bit stream may then be transmitted onto a transmission channel to the target decoder/receiver as desired (108). In one embodiment, the compressed video data is received, stored, processed and transmitted in real-time.

The process from 104 to 108 can be repeated again and again for normal operation until original an assumption of transmission demands is not valid and the system needs to be reconfigured. As transmission demands encountered by the network device change, the number of block pools and the common memory dedicated for each may vary. This will normally not happen often, e.g. in weeks or months. When this happens, the network device will be reconfigured to vary memory allocation accordingly to fit current demands (110). Any reconfiguration may cause disruption to real time service. If no reconfiguration is needed, the system goes back to normal operation (104).

Video, audio and general data are typically transmitted across the network device. The present invention is suitable for transmission and storage, regardless of data formatting. For example, the present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818; "Generic coding of moving pictures and associated audio information", November 1994, which is herein incorporated by reference. The present invention is also suitable for use with the MPEG-4 specification, described in ISO/IEC International Standard; "Coding of moving pictures and associated audio information", March 2000, which is herein incorporated by reference. The structure of an MPEG bit stream is well-known to one of skill in the art and not described in detail for sake of brevity.

The methods of this present invention may be implemented on various systems. For example, the invention may be implemented on network devices such as routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. In another specific embodiment, the systems of this invention may be specially configured CMTSs such as, for example, specially configured models in the uBR-7200 series of CMTSs available from Cisco Systems. A general architecture for some of these machines will be given below. In an alternative embodiment, the methods of this invention may be implemented on a video streaming server, a cache server, a web server, or a general-purpose network host machine such as a personal computer or workstation. Further, the invention may be at least partially implemented on a card (e.g., an interface card) for a network device or a general-purpose computing device.

Figure 5:
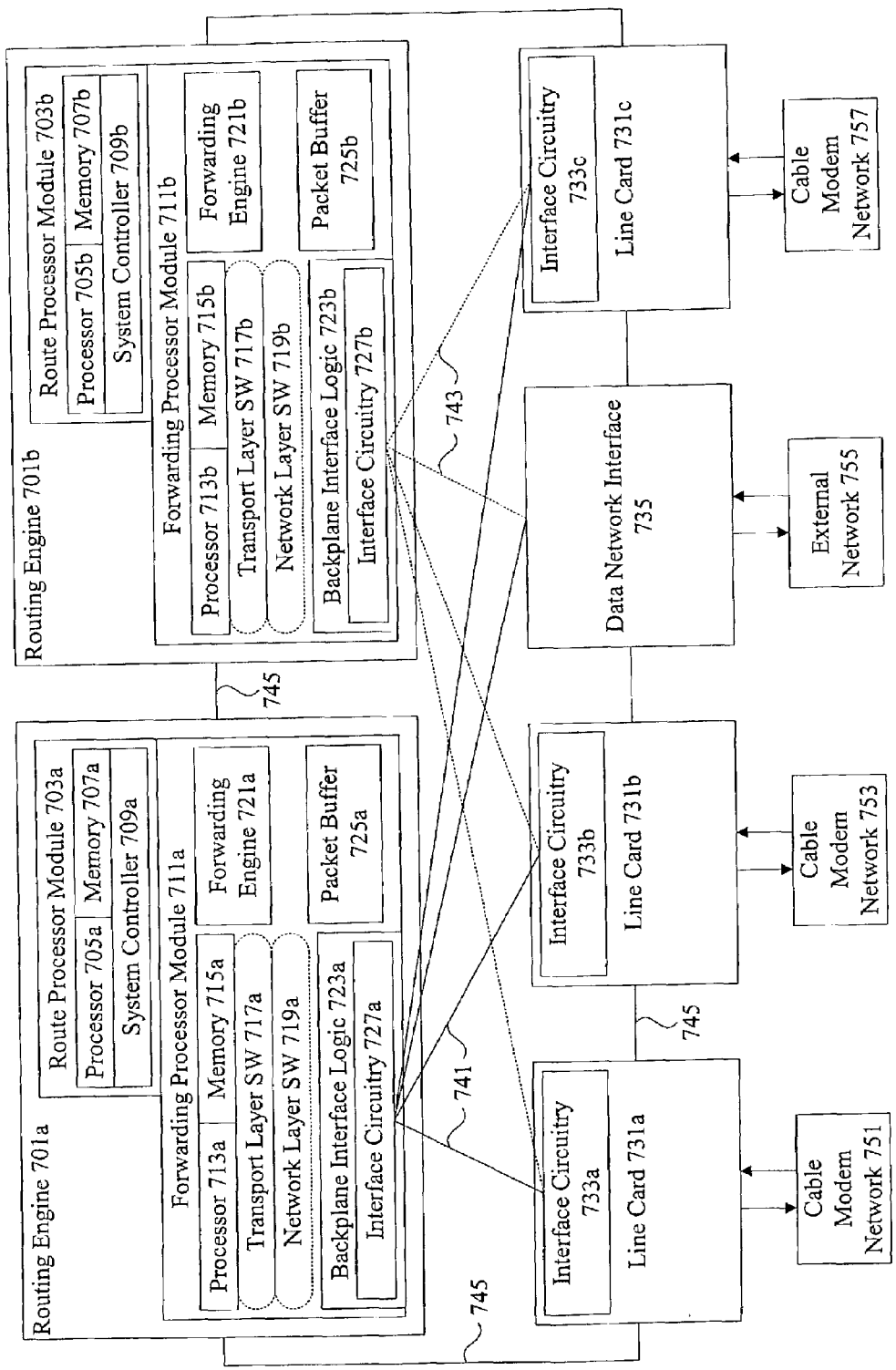
FIG. 5 is a block diagram of a router that may be used in conjunction with the techniques of the present invention.

FIG. 5 shows a block diagram of a specific embodiment of a Cable Modem Termination System (CMTS) 700 which may be used to implement certain aspects of the present invention. As shown in FIG. 5, the CMTS 700 may comprise a plurality of routing engines (e.g. 701a, 701b).

Each of the routing engines may include a variety of similar modules and/or components. According to a specific embodiment, Routing Engine A may be configured or designed to include a plurality of functionally different modules or components, including, for example, a Forwarding Processor (FP) Module 711a adapted to provide packet forwarding functionality; a Route Processor (RP) Module 703a adapted to implement routing or forwarding operations; a utility component adapted to provide system clock and timestamp functionality; etc. The routing engine components provide may be configured to provide layer one, layer two, layer three and layer four functionality as well as quality of service (QoS) functionality.

According to a specific implementation, the RP Module 703a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 4, the RP Module 703a comprises a general-purpose processor 705a (e.g., a MIPS route processor) coupled to a system controller 709a and memory 707a.

The memory 707a may comprise synchronous dynamic random access memory (SDRAM) storage locations addressable by the processor 705a for storing software programs, video data, combined buffers such as buffer 44, and data structures accessed by the components. It is specific embodiment, a combined buffer of the present invention such as buffer 44 is stored in dynamic random access memory (DRAM) or a burst random access memory (BRAM) or any other suitable RAM device. A network routing operating system, portions of which may reside in memory and executed by the route processor, functionally organizes the router by invoking network operations in support of software processes executing on the router.

The RP processor 705a may be configured to construct and load routing tables used by the FP Module 711a. The processor 705a may also be configured or designed to perform configuration management functions of the routing engine 701a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727a may be coupled to the respective interface circuitry 733a, 733b of line cards 731a, 731b. According to various embodiments, the FP Module 711 may comprise a processor 713a and memory 715a for handling transport layer 717 and network layer 719 functionality. The FP Module 711a may also be configured to provide transaction compacting functionality, data parcel tunneling functionality, video data transmission functionality, etc.

According to different embodiments of the present invention, one or more of the routing engines may be configured to communicate with a plurality of line cards (e.g. 731, 735) via point-to-point links. For example, as shown in FIG. 4, each of the plurality of line cards 731 and 735 are connected to each of the routing engines 701a, 701b via point-to-point links 741 and 743. One advantage of the point-to-point link configuration is that it provides additional reliability in that the failure of one or more line cards will not interfere with communications between other line cards and the routing engine(s). For example, if Line Card A 731a suddenly failed, each of the routing engines would still be able to communicate with the other line cards. In one embodiment, processing and memory functions described herein are implemented on one or more video line cards dedicated to transmission of video data, such as a median line card.

The techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Regardless of network device's configuration, it may employ one or more memories or memory modules (e.g., memory 707a, 715a, etc.) configured to store video data, program instructions for the network operations and other functions of the present invention described herein. The program instructions may specify an operating system and one or more applications, for example. Such memory or memories may also be configured to store data structures, video data, or other specific non-program information described herein.

Because such information and program instructions may be employed to implement the systems/methods described herein, the present invention relates to computer/machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the discussion to this point has focused on techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

One particular communication channel that is becoming increasingly common is the cable modem channel, such as that defined by the DOCSIS cable modem standard by CableLabs and the DAVIC cable modem standard by DVB. In DOCSIS based cable data networks, operators and digital service providers use the radio frequency spectrum in the coaxial cable network to deliver digital data signal in a 6 MHz frequency block. The aggregate data bit rate capacity of the block may be shared by multiple, possibly different, types of information services. Cable modem service is one such information service that allows service operators to provide a number of two-way interactive digital services to subscribers. One particular digital service delivers a compressed digital video signal for video streaming or video on demand.

Another particular communication channel that is becoming increasingly common is IP networks and Asynchronous Transfer Mode (ATM) networks. Both networks are based on different transport protocols which can be used to transport data or multimedia bit streams with a pre-specified quality of service. For example, ATM protocol specifies how data is first packetized into fixed sized data units, called cells. It also specifies how such a cell stream can be multiplexed, de-multiplexed, switched and routed between different locations to support end-to-end connections at given bit rate and/or quality of service (QOS).

In another communication channel example, integrated services (IntServ), differential services (DiffServ), and Multiple Protocol Label Switch (MPLS) are used to establish a QOS for different network traffic. These services may use the Common Open Policy Service (COPS) for admission control. Internet Group Management Protocol (IGMP) and a variety of multicast routing protocols are also used to establish and tear down service on a multicast tree, which is commonly used for video transmission. In all these cases, the requested connection must provide the available bandwidth for the data being sent or the requested connection may either have to be rejected or a new set of admissible connection parameters may have to be negotiated.

While this invention has been described in terms of several preferred embodiments, there are alterations, permutations, and equivalents which fall within the scope of this invention which have been omitted for brevity's sake. It is therefore intended that the scope of the invention should be determined with reference to the appended claims.

What is claimed is:

1. A network device for transmitting multiple bit streams having different bit rates, the network device comprising:
    an input network interface arranged to receive the multiple bit streams;
    a memory arranged to include multiple block pools, each block pool including a set of blocks having a memory size common to the block pool, the multiple block pools each having a different common memory size;
    a processor arranged to allocate data from the multiple bit streams to a block in one of the multiple block pools when the data has a storage requirement equal to or less than the common memory size for the block pool, the processor arranged to identify a bit rate for transmitting the data and a time delay for processing the data before transmission, wherein the storage requirement is determined using the bit rate for transmitting the data and the time delay for processing the data before transmission; and
    an output network interface that outputs the data.

2. The network device of claim 1 wherein:
    the input network interface receives the multiple bit streams from a plurality of channels; and
    the processor is operable to allocate data from a particular channel to a block in a block pool based on the bandwidth requirement of the particular channel.

3. The network device of claim 2 wherein the number of block pools in the multiple block pools is related to one of: the number of channels, the maximum bandwidth for the plurality of channels, and the total input bandwidth for the plurality of channels.

4. The network device of claim 2 wherein the common memory size for a block pool is related to one of the number of channels, the maximum bandwidth for the plurality of channels, and the total input bandwidth for the plurality of channels.

5. The network device of claim 1 wherein the memory is arranged to include 2 to 20 block pools.

6. The network device of claim 5 wherein the memory is arranged to include 2 to 5 block pools.

7. The network device of claim 1 wherein the data is allocated based on the type of data included in a particular bit stream.

8. The network device of claim 1 wherein the time delay for processing the data is substantially constant for a particular bit stream.

9. The network device of claim 8 wherein the substantially constant time delay is related to the end to end system delay for all channels being serviced.

10. The network device of claim 1 wherein each block pool is arranged to include between 1 and 100 blocks.

11. The network device of claim 10 wherein each block pool is arranged to include between 1 and 10 blocks.

12. The network device of claim 1 wherein the common memory size for the block in one of the plurality of block pools is arranged to include from about 1 MB to about 20 MB per block in the block pool.

13. The network device of claim 12 wherein the memory comprises one or more RAM.

14. A method for transmitting multiple bit streams having varying bit rates, the method comprising:
arranging a memory space to include multiple block pools, each block pool including a set of blocks having a memory size common to the block pool, the multiple block pools each having a different common memory size;
receiving the multiple bit streams;
storing data from the multiple bit streams in a block in one of the multiple block pools when the data has a storage requirement equal to or less than the common memory size for the block pool;
identifying a bit rate for transmitting the data and a time delay for processing the data before transmission, wherein the storage requirement is determined using the bit rate for transmitting the data and the time delay for processing the data before transmission; and
transmitting the multiple bit streams onto an output channel.

15. The method of claim 14 wherein:
receiving the multiple bit streams occurs from a plurality of channels; and
allocating the data from a particular channel to a block in a block pool is based on the bandwidth requirement of the particular channel.

16. The method of claim 15 wherein the number of block pools in the multiple block pools is related to one of: the number of channels, the maximum bandwidth for the plurality of channels, and the total input bandwidth for the plurality of channels.

17. The method of claim 15 wherein the common memory size for the block is related to one of: the number of channels, the maximum bandwidth for the plurality of channels, and the total input bandwidth for the plurality of channels.

18. The method of claim 14 wherein the memory is arranged to include 2 to 20 block pools.

19. The method of claim 18 wherein the memory is arranged to include 2 to 5 block pools.

20. The method of claim 18 wherein the storage requirement for the data is related to at least (i) a bit rate for transmitting the data and (ii) a time delay for processing the data before transmission.

21. The method of claim 20 wherein the time delay for processing the data is substantially constant for a particular bit stream.

22. The method of claim 21 wherein the common memory size for the block is from about 1 MB to about 20 MB.

23. The method of claim 14 wherein multiple bit streams bit streams include one of: compressed video data, compressed audio data and general data.

24. The method of claim 14 further comprising transcoding video data.

25. The method of claim 14 wherein each block pool includes between 1 and 100 blocks.

26. The method of claim 25 wherein each block pool includes between 1 and 10 blocks.

27. A system for transmitting multiple bit streams having different bit rates, the system comprising:
means for arranging a memory space to include multiple block pools, each block pool including a set of blocks having a memory size common to the block pool, the multiple block pools each having a different common memory size;
means for receiving the multiple bit streams;
means for storing data from the multiple bit streams in a block in one of the multiple block pools when the data has a storage requirement equal to or less than the common memory size for the block pool;
means for identifying a bit rate for transmitting the data and a time delay for processing the data before transmission, wherein the storage requirement is determined using the bit rate for transmitting the data and the time delay for processing the data before transmission; and
means for transmitting the multiple bit streams onto an output channel.

28. The system of claim 27 further comprising means for transcoding video data.

29. The system of claim 27 wherein:
the means for receiving the multiple bit streams received the bit streams from a plurality of channels; and
the means for allocating the data from a particular channel to a block in a block pool allocates based on the bandwidth requirement of the particular channel.

30. A computer readable medium encoded with computer executable instructions for transmitting multiple bit streams having varying bit rates, the instructions comprising:
instructions for arranging a memory space to include multiple block pools, each block pool including a set of blocks having a memory size common to the block pool, the multiple block pools each having a different common memory size;
instructions for receiving the multiple bit streams;
instructions for storing data from the multiple bit streams in a block in one of the multiple block pools when the data has a storage requirement equal to or less than the common memory size for the block pool;
instructions for identifying a bit rate for transmitting the data and a time delay for processing the data before transmission, wherein the storage requirement is determined using the bit rate for transmitting the data and the time delay for processing the data before transmission; and
instructions for transmitting the multiple bit streams onto an output channel.

* * * * *